US012565795B2

(12) United States Patent
Ohl et al.

(10) Patent No.: US 12,565,795 B2
(45) **Date of Patent: *Mar. 3, 2026**

(54) ELECTROMECHANICAL LOCKSET

(71) Applicant: Schlage Lock Company LLC, Carmel, IN (US)

(72) Inventors: James D. Ohl, Colorado Springs, CO (US); Richard A. White, Carmel, IN (US); Joseph W. Baumgarte, Carmel, IN (US); Ryan C. Kincaid, Indianapolis, IN (US); Matthew Dexter, Indianapolis, IN (US); John Evenson, Greentown, IN (US)

(73) Assignee: Schlage Lock Company LLC, Carmel, IN (US)

( * ) Notice: Subject to any disclaimer, the term of this patent is extended or adjusted under 35 U.S.C. 154(b) by 1139 days.

This patent is subject to a terminal disclaimer.

(21) Appl. No.: 17/131,003

(22) Filed: Dec. 22, 2020

(65) Prior Publication Data

US 2021/0285257 A1 Sep. 16, 2021

Related U.S. Application Data

(63) Continuation of application No. 16/533,333, filed on Aug. 6, 2019, now Pat. No. 10,871,008, which is a (Continued)

(51) Int. Cl.

*E05B 63/10* (2006.01)
*E05B 47/00* (2006.01)
(Continued)

(52) U.S. Cl.

CPC .......... *E05B 63/10* (2013.01); *E05B 47/0001* (2013.01); *E05B 47/068* (2013.01); (Continued)

(58) Field of Classification Search

CPC ............. E05B 47/0603; E05B 47/0657; E05B 47/0661; E05B 47/0676; E05B 47/068; (Continued)

(56) References Cited

U.S. PATENT DOCUMENTS 3,559,430 A * 2/1971 Waller ............... G07C 9/00666 70/284
5,421,178 A 6/1995 Hamel et al.
(Continued)

FOREIGN PATENT DOCUMENTS

CN 102498254 A * 6/2012 ............. E05B 17/22
CN 102549625 A * 7/2012 ......... G07C 9/00309

OTHER PUBLICATIONS

European Examination Report; European Patent Office; European Patent Application No. 21167012.0; May 11, 2022; 5 pages.
(Continued)

*Primary Examiner* — Alyson M Merlino

(74) *Attorney, Agent, or Firm* — Taft Stettinius & Hollister LLP

(57) ABSTRACT

An exemplary lockset is configured for installation in a standard door preparation, and includes an exterior assembly, an interior assembly, and a center assembly connecting the exterior and interior assemblies. The exterior assembly includes an exterior escutcheon which houses a credential reader assembly including a multi-tech credential reader. The interior assembly includes an interior escutcheon which houses a control system. The center assembly includes a chassis, an outer surface of which may define a channel. The credential reader assembly is in communication with the control assembly via a wire harness, a portion of which may pass through the channel.

18 Claims, 10 Drawing Sheets

Related U.S. Application Data continuation of application No. 15/426,742, filed on Feb. 7, 2017, now Pat. No. 10,370,870, which is a continuation of application No. 14/550,477, filed on Nov. 21, 2014, now Pat. No. 9,562,370.

(51) Int. Cl.
*E05B 47/06* (2006.01)
*E05B 55/00* (2006.01)

(52) U.S. Cl.
CPC .... *E05B 55/005* (2013.01); *E05B 2047/0071* (2013.01); *E05B 2047/0094* (2013.01)

(58) Field of Classification Search
CPC ..... E05B 2047/0094; E05B 2047/0095; E05B 47/0001; E05B 3/06; E05B 3/065; E05B 2047/0071; E05B 63/10; Y10T 70/7068; Y10T 70/7102; Y10T 70/7107; Y10T 70/713; Y10T 70/7062; Y10T 70/7073; Y10T 70/7079; Y10T 70/7113; Y10T 70/7119; Y10T 70/7124; Y10T 70/7136; Y10T 292/57; Y10T 292/88; Y10T 292/91; Y10S 292/61
See application file for complete search history.

(56) References Cited

U.S. PATENT DOCUMENTS

| | | | | |
|---|---|---|---|---|
| 5,931,430 | A | 8/1999 | Palmer | |
| 6,038,896 | A | 3/2000 | Chamberlain et al. | |
| 6,418,765 | B1 | 7/2002 | Chiu | |
| 6,845,642 | B2 | 1/2005 | Ocana | |
| 6,935,149 | B1 * | 8/2005 | Peng | E05B 13/101 70/277 |
| 7,984,631 | B2 | 7/2011 | Case et al. | |
| 8,051,689 | B1 * | 11/2011 | Shen | E05B 47/068 70/279.1 |
| 8,141,400 | B2 | 3/2012 | Sorensen et al. | |
| 8,272,241 | B2 | 9/2012 | Brown et al. | |
| 8,356,499 | B2 * | 1/2013 | Peng | E05B 47/068 70/279.1 |
| 8,621,900 | B2 | 1/2014 | Wu et al. | |
| 9,199,575 | B2 * | 12/2015 | Ovenshire | E05B 17/10 |
| 9,562,370 | B2 | 2/2017 | Ohl et al. | |
| 10,047,544 | B2 * | 8/2018 | Yen | E05B 47/0012 |
| 10,370,870 | B2 | 8/2019 | Ohl et al. | |
| 2004/0025550 | A1 | 2/2004 | Yamagishi | |
| 2006/0049644 | A1 | 3/2006 | Bergen et al. | |
| 2006/0114099 | A1 | 6/2006 | Deng et al. | |
| 2006/0226948 | A1 * | 10/2006 | Wright | G07C 9/00309 340/5.25 |
| 2007/0163863 | A1 * | 7/2007 | Mitchell | G07C 9/00904 200/43.04 |
| 2009/0025438 | A1 | 1/2009 | Don et al. | |
| 2010/0031713 | A1 | 2/2010 | Brown et al. | |
| 2012/0006082 | A1 | 1/2012 | Peng | |
| 2012/0055213 | A1 | 3/2012 | Sorensen et al. | |
| 2012/0212001 | A1 | 8/2012 | Benetiz et al. | |
| 2012/0218076 | A1 * | 8/2012 | Zacchio | G07C 9/00571 343/720 |
| 2014/0109634 | A1 | 4/2014 | Almomani et al. | |
| 2014/0165677 | A1 | 6/2014 | Hickman | |
| 2014/0250956 | A1 * | 9/2014 | Chong | G07C 9/00944 70/278.1 |
| 2014/0260451 | A1 | 9/2014 | Quach et al. | |
| 2014/0265376 | A1 | 9/2014 | Walls et al. | |
| 2015/0184424 | A1 | 7/2015 | Lowder et al. | |
| 2015/0240530 | A1 | 8/2015 | Mani et al. | |
| 2015/0315816 | A1 * | 11/2015 | Gopalakrishnan | E05B 63/06 70/344 |
| 2016/0040450 | A1 | 2/2016 | Shiu et al. | |

OTHER PUBLICATIONS

Extended European Search Report; European Patent Office; European Patent Application No. 21167012.0; Sep. 28, 2021; 10 pages.
JAE Examination Report; UAE Patent Office; UAE Patent Application No. P6000602/2017; Jul. 18, 2021; 4 pages.
European Examination Report; European Patent Office; European Patent Application No. 21167012.0; Dec. 5, 2024; 4 pages.

* cited by examiner

ELECTROMECHANICAL LOCKSET

CROSS-REFERENCE TO RELATED APPLICATIONS

The present application is a continuation of U.S. patent application Ser. No. 16/533,333 filed Aug. 6, 2019 and issued as U.S. Pat. No. 10,871,008, which is a continuation of U.S. patent application Ser. No. 15/426,742 filed Feb. 7, 2017 and issued as U.S. Pat. No. 10,370,870, which is a continuation of U.S. patent application Ser. No. 14/550,477 filed Nov. 21, 2014 and issued as U.S. Pat. No. 9,562,370, the contents of each application hereby incorporated by reference in their entirety.

TECHNICAL FIELD

The present disclosure generally relates to electromechanical locksets, and more particularly but not exclusively relates to electromechanical cylindrical locksets.

BACKGROUND

Electromechanical locksets are commonly used to control access to a room or enclosed area. Some such systems have certain limitations including, for example, compatibility with existing door preparations. Therefore, a need remains for further improvements in this area of technology.

SUMMARY

An exemplary lockset is configured for installation in a standard door preparation, and includes an exterior assembly, an interior assembly, and a center assembly interconnecting the exterior and interior assemblies. The exterior assembly includes an exterior escutcheon which houses a credential reader assembly including a multi-tech credential reader. The interior assembly includes an interior escutcheon which houses a control system. The center assembly includes a chassis, an outer surface of which defines a channel. The credential reader assembly may be in communication with the control assembly via a wire harness, a portion of which may pass through the channel in the outer surface of the center assembly chassis. Further embodiments, forms, features, and aspects of the present application shall become apparent from the description and figures provided herewith.

DETAILED DESCRIPTION OF ILLUSTRATIVE EMBODIMENTS

Figure 1:
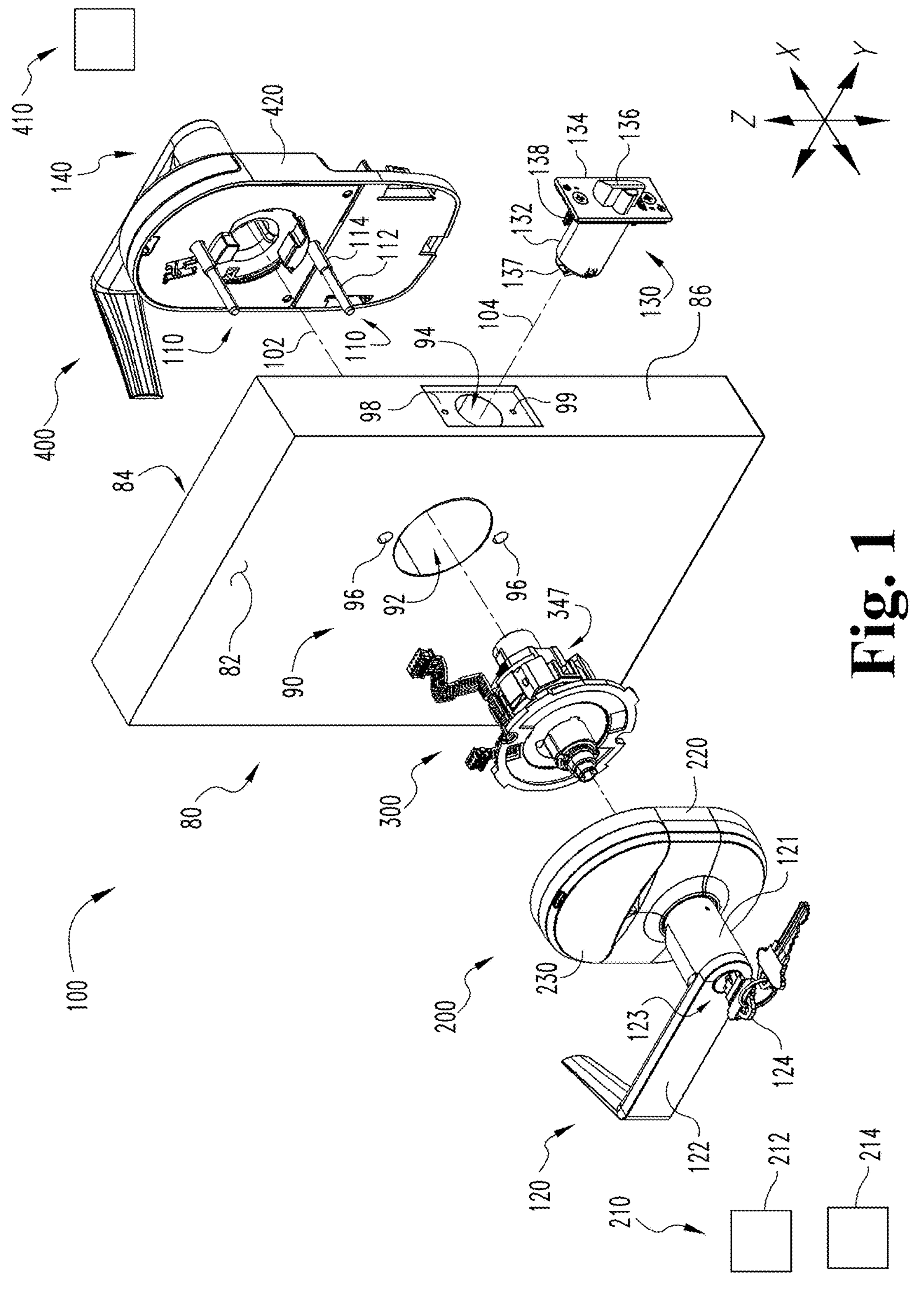
FIG. 1 is an exploded illustration of a lockset assembly according to one embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, illustrated therein is a cylindrical lockset 100 according to one embodiment for installation in a door 80. The cylindrical lockset 100 generally includes an exterior assembly 200, a center assembly 300, and an interior assembly 400. The lockset 100 may further include a pair of fasteners such as mounting bolts 110 which couple the exterior assembly 200 to the interior assembly 400, an exterior handle 120 coupled to the exterior assembly 200, a latch mechanism 130 coupled to the center assembly 300, and an interior handle 140 coupled to the interior assembly 400. As described in further detail below, the lockset 100 is configured to selectively prevent the exterior handle 120 from actuating the latch mechanism 130. The lockset 100 thus controls access through the door 80 such that the door 80 defines a barrier between an unsecured region and a secured region.

The door 80 includes an exterior surface 82 facing the unsecured region, an interior surface 84 facing the secured region, a free edge 86 positioned adjacent a door jamb (not shown) when the door 80 is closed, and a standard door preparation 90. While other forms are contemplated, the illustrated door preparation 90 includes a cross-bore 92 extending along a longitudinal axis 102, a side bore 94 extending along a lateral axis 104, a pair of fastener bores 96 positioned on opposite sides of the cross-bore 92, and a recess 98 formed in the free edge 86. When the lockset 100 is installed on the door 80, the exterior assembly 200 is seated against the exterior surface 82, the center assembly 300 is positioned in the cross-bore 92, and the interior assembly 400 is seated against the interior surface 84. While the illustrated door preparation 90 is of a type commonly found in wood-type doors, it is also contemplated that other forms of standard door preparations may be utilized including, for example, those commonly found in metal doors.

Figure 2:
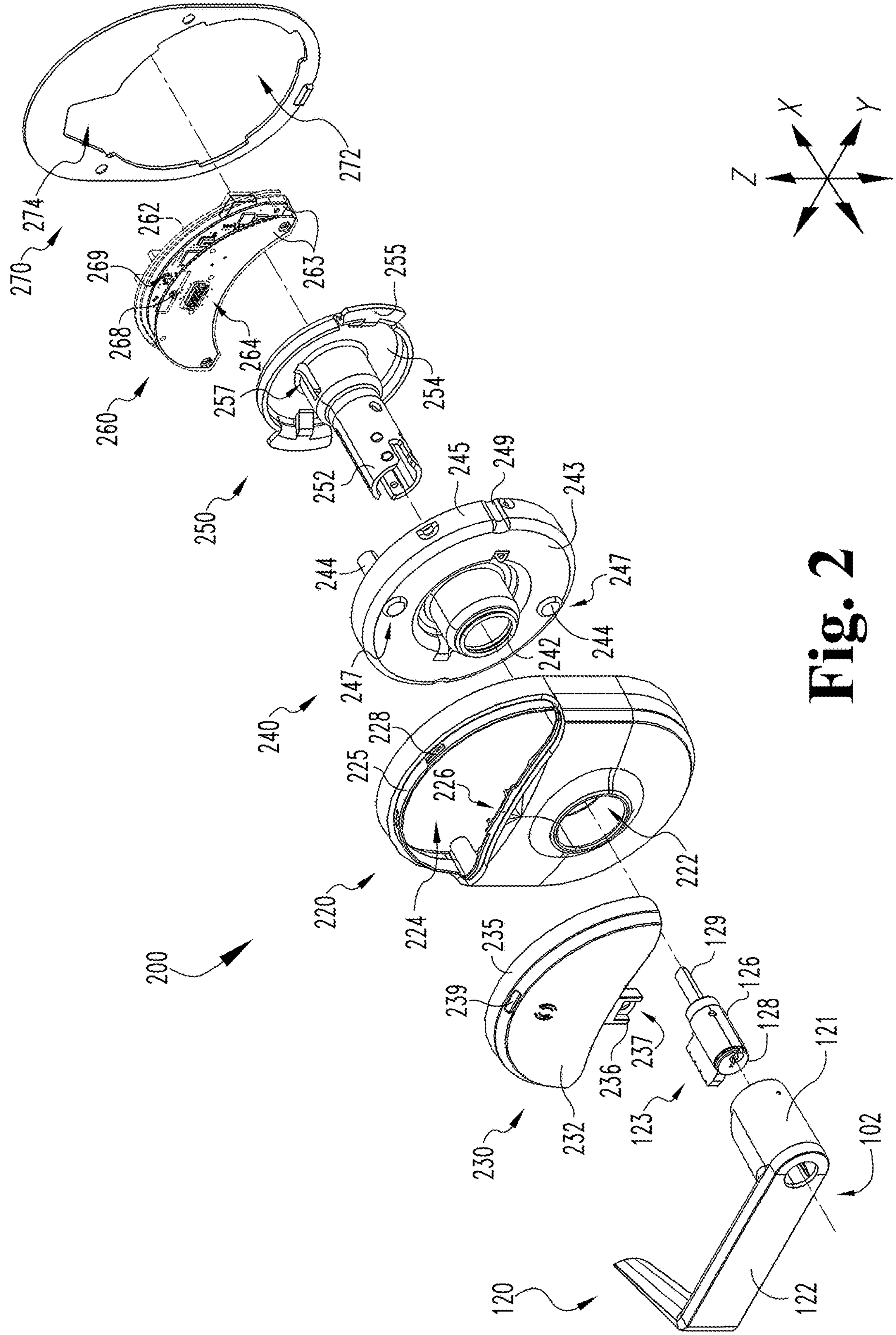
FIG. 2 is an exploded illustration of an exterior assembly according to one embodiment of the lockset shown in FIG. 1.

The exterior handle 120 is accessible from the unsecured region when the door 80 is closed, and generally includes a hub portion 121 extending along the longitudinal axis 102, and a lever portion 122 extending from the hub portion 121. The hub portion 121 may house a lock cylinder 123 operable by a key 124. As illustrated in FIG. 2, the lock cylinder 123 includes a shell 126, a selectively rotatable barrel 128 positioned in the shell 126, and a tailpiece 129 rotationally coupled with the barrel 128. When the correct key 124 is inserted, the barrel 128 is free to rotate. While each of the illustrated handles 120, 140 is configured as a lever, it is also contemplated that one or both of the levers may be replaced by another form of an actuator such as, for example, a knob. The exemplary latch mechanism 130 includes a housing 132, a faceplate 134 coupled to the housing 132, and a latch bolt 136 slidably mounted in the housing 132. When installed, the housing 132 is seated in the side bore 94 such that a coupling feature 137 attached to the end of the latch bolt 136 extends into the cross-bore 92. The faceplate 134 is seated in the recess 98 and may be secured to the door 80 by fasteners 138 such as, for example, screws.

Figure 3:
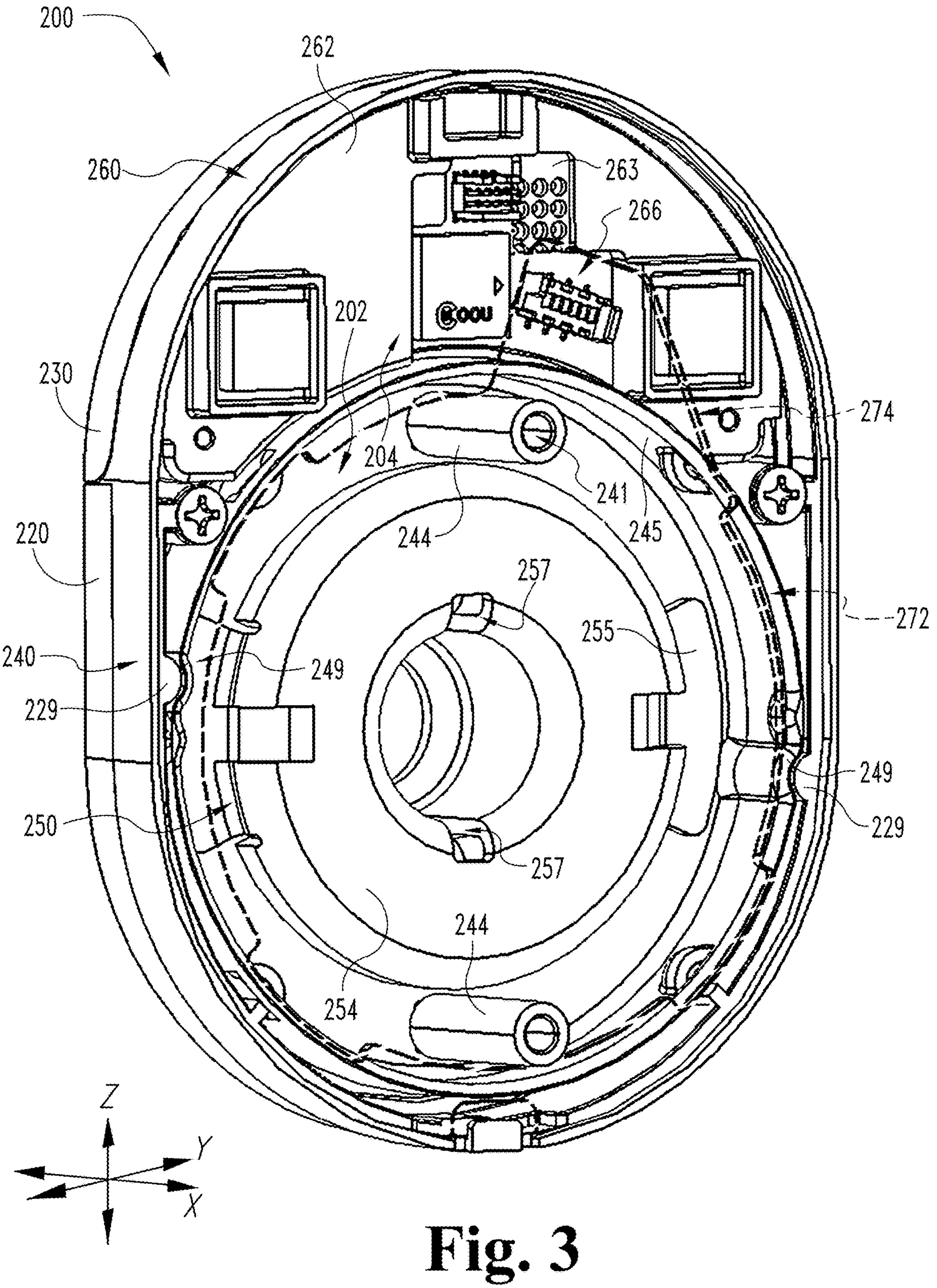
FIG. 3 is a perspective illustration of the exterior assembly depicted in FIG. 2.

With additional reference to FIGS. 2 and 3, the exterior assembly 200 generally includes an exterior escutcheon 220, an exterior window 230 mounted on the escutcheon 220, an exterior spring cage 240 seated in the escutcheon 220, an exterior spindle 250 rotationally coupled to the handle 120, a credential reader assembly 260 positioned on the distal side of the window 230, and an exterior backplate 270 which retains the spring cage 240 and credential reader assembly 260 within the escutcheon 220.

The exterior escutcheon 220 includes a hole 222 configured to receive a portion of the exterior spindle 250, and an opening 224 have a geometry corresponding to that of the exterior window 230. The exterior escutcheon 220 may further include a lip 225 defining the opening 224, a guide slot 226 adjacent the opening 224, and/or one or more mounting slots 228 which may be formed in the lip 225.

The exterior window 230 includes a face 232 configured to permit wireless communication between the credential reader assembly 260 and a credential 210 presented near the window 230. The window 230 may further include a lip 235 which engages the exterior escutcheon lip 225, and a post 236 received in the guide slot 226. The post 236 may include an opening 237 through which a fastener such as, for example, a screw (not shown) may be passed to secure the window 230 to the exterior escutcheon 220. Additionally, the lip 235 may include a pair of ridges (see ridges 438 in FIG. 6) which engage the mounting slots 228 to further secure the window 230 to the escutcheon 220.

The exterior spring cage 240 generally includes a central opening 242 formed in a plate 243, and a pair of posts 244 extending distally (i.e., toward the center assembly 300) from the plate 243 and positioned on opposite sides of the opening 242. The plate 243 may include a pair of holes 247 positioned on opposite sides of the opening 242, and the posts 244 may be configured as lugs mounted to the plate 243 via the holes 247. The illustrated spring cage 240 further includes a circumferential lip 245 which abuts the backplate 270 such that the spring cage 240 defines a boundary between an inner region 202 and an outer region 204. In certain embodiments, the spring cage 240 may be rotationally coupled to the exterior escutcheon 220. For example, the lip 245 may include one or more grooves 249, and the escutcheon 220 may include a corresponding number of protrusions 229 (FIG. 3). The protrusions 229 may be engaged within the grooves 249, thereby preventing rotation of the exterior escutcheon 220 with respect to the spring cage 240.

The exterior spindle 250 includes a tubular portion 252 configured to be received in the exterior handle hub portion 121. In certain forms, the lock cylinder 123 may be housed in the tubular portion 252. The exterior spindle 250 further includes a torque plate 254 which may include one or more wings 255 extending radially from the torque plate 254. When assembled, the tubular portion 252 extends through the spring cage central opening 242, and the torque plate 254 is positioned on the distal side of the spring cage plate 243 in the inner region 202. The spring cage 240 may house one or more springs (not shown) engaged with the wings 255 such that the exterior spindle 250 is rotationally biased to a home position. The spindle 250 may further include one or more channels 257 (FIG. 3) extending proximally from the distal side of the torque plate 254 and into the tubular portion 252.

The credential reader assembly 260 generally includes a housing 262, a printed circuit board (PCB) 263 seated in the housing 262, a credential reader 264 mounted to the PCB 263, and an exterior jack 266 (FIG. 3) mounted to the PCB 263 and in communication with the credential reader 264. When assembled, the credential reader assembly 260 is positioned in the outer region 204 on the distal side of the window 230 such that the credential reader 264 is able to communicate wirelessly via the window 230. While other forms are contemplated, the illustrated credential reader 264 is a multi-tech credential reader which supports both smart card and proximity (prox) card protocols. In other words, the illustrated credential reader 264 is capable of reading each of a smart card 212 and a proximity card 214. The credential reader assembly 260 may further include a visual indicator such as, for example, a light emitting diode (LED) 268 aligned with an opening 239 in the window 230, and/or a proximity sensor 269 such as, for example, a capacitance sensor.

The exterior backplate 270 is mounted to the distal side of the exterior escutcheon 220 and retains various elements of the exterior assembly 200 within the escutcheon 220. The backplate 270 includes a primary opening 272 and a secondary opening 274 that extends from the inner region 202 to the outer region 204. While the illustrated secondary opening 274 is configured as a radial extension of the primary opening 272, it is also contemplated that the secondary opening 274 may be separate from the primary opening 272. The secondary opening 274 is aligned with the jack 266 such that when exterior assembly 200 is assembled, the jack 266 is accessible from the distal side of the backplate 270.

As shown in FIG. 3, when the exemplary exterior assembly 200 is assembled, the posts 244 are the only elements of the assembly 200 which extend distally beyond the distal surface of the backplate 270. When the exterior assembly 200 is mounted on the door 80, the distal ends of the posts 244 are received in the fastener bores 96, and the backplate 270 may be positioned substantially flush with the door exterior surface 82.

Figure 4:
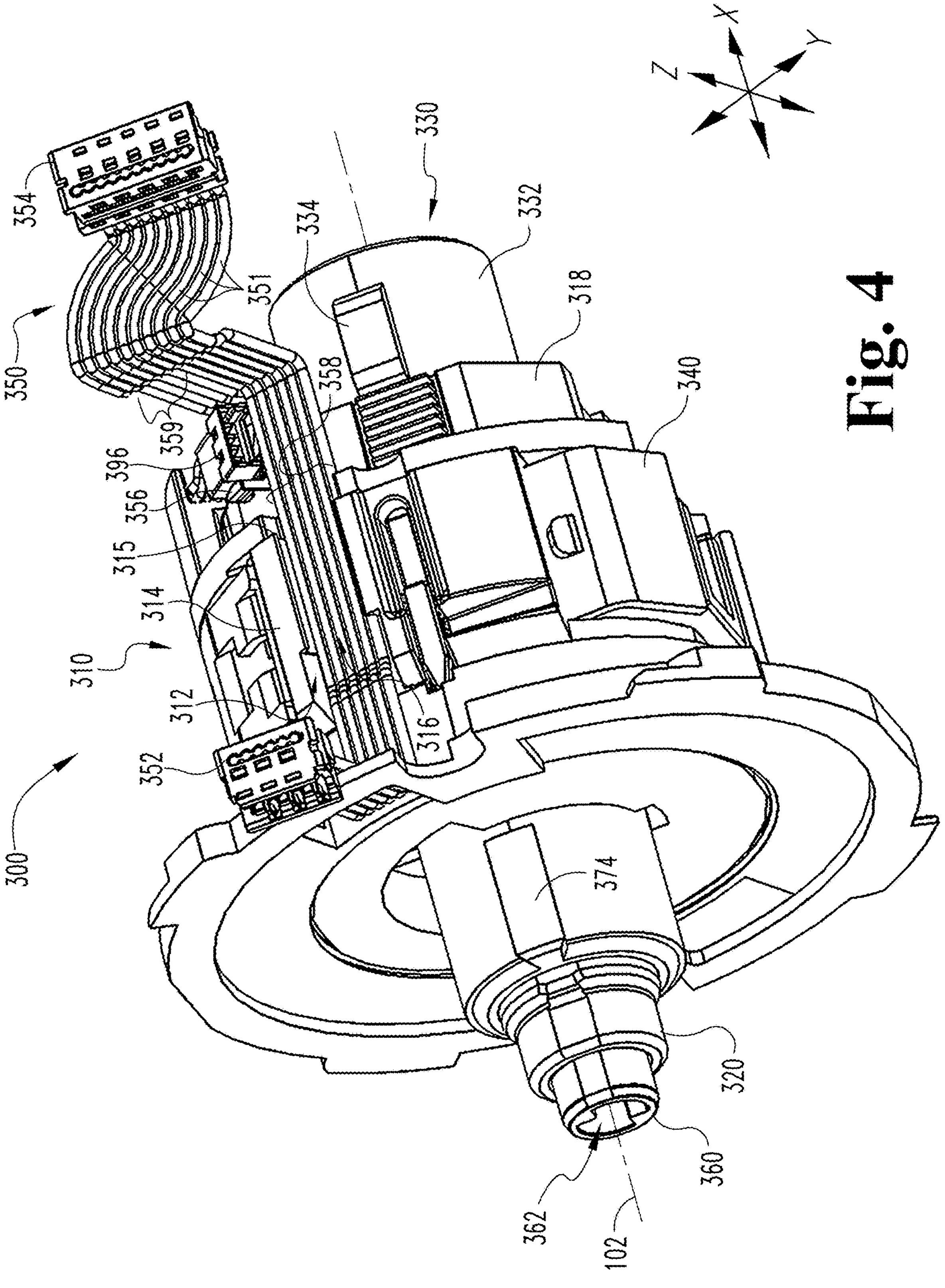
FIG. 4 is a perspective illustration of a center assembly according to one embodiment of the lockset shown in FIG. 1.
Figure 5:
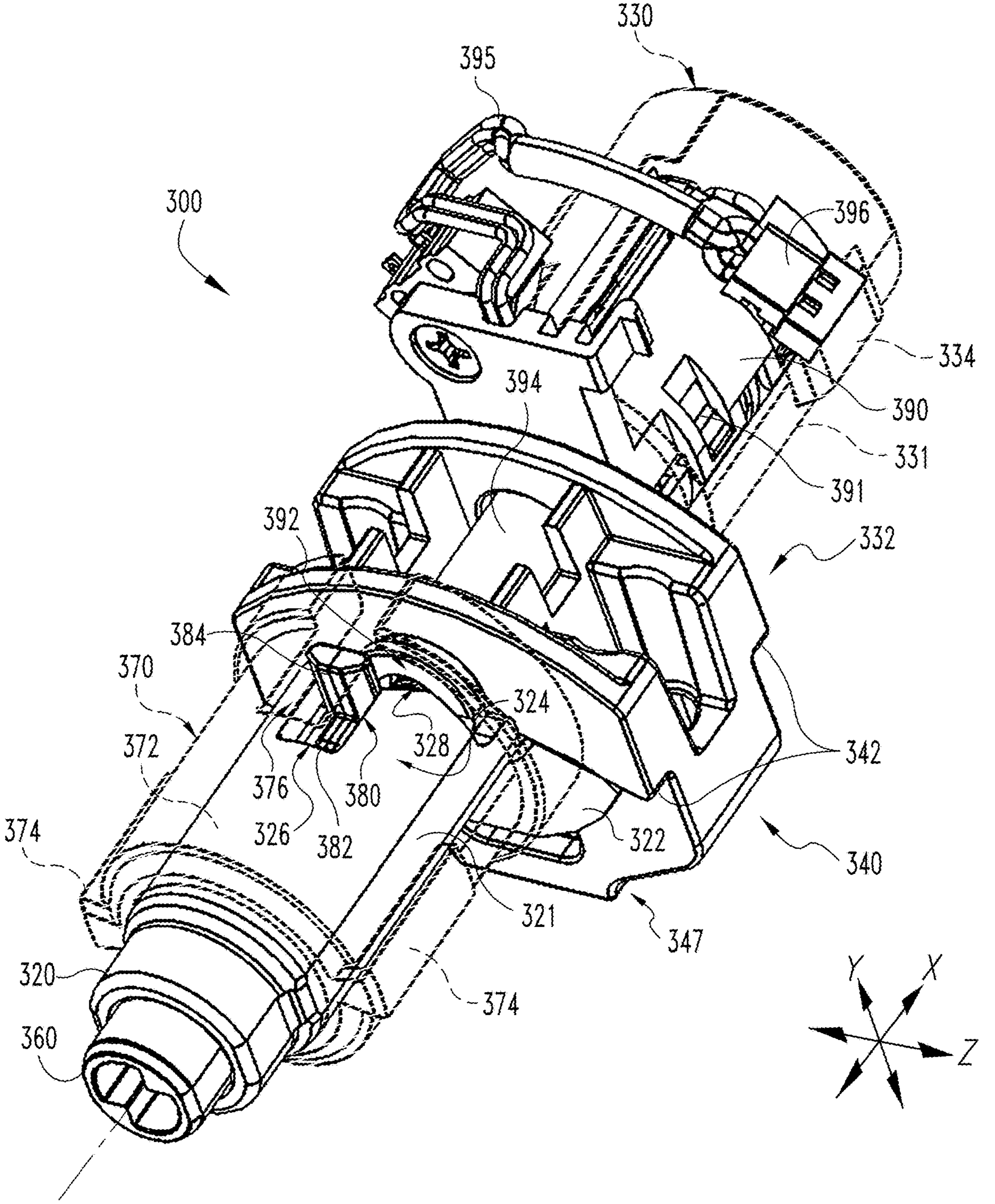
FIG. 5 is a perspective illustration of a portion of the center assembly depicted in FIG. 4.

With reference to FIGS. 4 and 5, the center assembly 300 generally includes a chassis 310, an outer drive spindle 320 rotatably mounted on the proximal side of the chassis 310, an inner drive spindle 330 rotatably mounted on the distal side of the chassis 310, and a retractor 340 slidably mounted to the chassis 310 between the outer drive spindle 320 and the inner drive spindle 330. The illustrated center assembly 300 further includes a wire harness 350, a key cam 360 rotatably mounted in the outer drive spindle 320, and a sleeve spindle 370 rotatably mounted on the outer drive spindle 320 such that the key cam 360, the outer drive spindle 320, and the sleeve spindle 370 are positioned concentrically about the longitudinal axis 102. As illustrated in FIG. 5, the center assembly 300 further includes a locking member 380 slidably mounted in the outer drive spindle 320, and an electromechanical actuator 390 positioned in the inner drive spindle 330. As described in further detail below, the locked or unlocked state of the lockset 100 is controlled by the position of the locking member 380, and the actuator 390 is operable to move the locking member 380 between a locking position and an unlocking position.

The chassis 310 is sized and configured to be mounted in the cross-bore 92 and includes a channel 312 sized and configured to receive a portion of the wire harness 350. The illustrated channel 312 is defined by a pair of walls 314 formed on a radially outer surface of the chassis 310. One or both of the walls 314 may include a flange 315 extending into the channel 312, such that a slot 316 is defined between the flanges 315. The chassis 310 may further include a pair of flat portions 318 by which the chassis 310 may be rotationally coupled to the interior assembly 400.

As shown in FIG. 5, the outer drive spindle 320 includes a tubular body 321, an arm 322 extending radially outward from the distal end of the body 321, and a T-shaped opening 324 formed in the distal portion of the body 321. The opening 324 includes a longitudinal slot 326 extending in the longitudinal or axial direction, and a circumferential slot 328 extending about at least a portion of the circumference of the body 321. The inner drive spindle 330 includes a substantially cylindrical body 331, an arm 332 (obscured from view) extending radially outward from the proximal end of the body 331, and a pair of ridges 334 extending radially outward from the distal portion of the body 331. The exemplary inner drive spindle 330 is hollow and houses at least a portion of the actuator 390.

The retractor 340 is positioned between the outer drive spindle 320 and the inner drive spindle 330. The retractor 340 is configured to move laterally in response to rotation of the outer drive spindle 320 or the inner drive spindle 330. More specifically, the retractor 340 includes a pair of shoulders 342, each of which is positioned adjacent one of the arms 322, 332. When the outer drive spindle 320 is rotated, the radial arm 322 engages the shoulder 342 on the proximal side of the retractor 340, thereby causing the retractor 340 to move laterally. Similarly, when the inner drive spindle 330 is rotated, the radial arm 332 engages the shoulder 342 on the distal side of the retractor 340, which likewise causes the retractor 340 to move laterally. As shown in FIG. 1, the retractor 340 also includes a coupling feature 347 configured to matingly engage the coupling feature 137 of the latch bolt 136. When the lockset 100 is assembled, the latch bolt 136 is coupled to the retractor 340 via the engaged coupling features 137, 347 such that lateral movement of the retractor 340 causes the latch bolt 136 to extend and retract.

The wire harness 350 is configured to transmit electrical signals and power between the exterior assembly 200, the interior assembly 400, and the actuator 390. The wire harness 350 includes an exterior plug 352, an interior plug 354, an actuator plug 356, and a plurality of wires 351 connecting the interior plug 354 to the exterior plug 352 and the actuator plug 356. More specifically, a first strip 358 includes a subset of the wires 351 connecting the interior plug 354 to the exterior plug 352, and a second strip 359 includes a second subset of the wires 351 connecting the interior plug 354 to the actuator plug 356. Each of the plugs is configured to engage a corresponding jack such that an electrical connection is formed between the wires of the plug and the wires of the jack. For example, the exterior plug 352 is configured to engage the exterior jack 266. While the terms “plug” and “jack” are occasionally used to indicate male and female connections, respectively, the terms as utilized herein refer to mating portions of an electrical junction. Thus, a plug need not be in the form of a male connector so long as it is configured to engage a corresponding jack, which need not necessarily be in the form of a female connector.

When the lockset 100 is assembled and installed on the door 80, a portion of the first strip 358 passes through the channel 312 such that the first strip 358 passes through the cross-bore 92. As noted above, in certain embodiments, the walls 314 defining the channel 312 may include flanges 315. In such embodiments, the distance between the flanges 315 may be less than the width of the first strip 358 such that the flanges 315 retain the first strip 358 in the channel 312.

The key cam 360 is rotatably mounted in the outer drive spindle 320 and is engaged with the lock cylinder 123. For example, the tailpiece 129 may be received in a bowtie opening 362 formed in the key cam 360 such that the key cam 360 rotates in response to rotation of the barrel 128 through a predetermined angle. In the illustrated form, the key cam 360 includes a radial post (not illustrated) which extends into a circumferential channel in the outer drive spindle 320, thereby forming a rotational lost motion connection between the key cam 360 and the spindle 320. As a result, rotation of the key cam 360 through a predetermined angle causes the outer drive spindle 320 to rotate, which in turn causes lateral movement of the retractor 340 and retraction of the latch bolt 136. In other embodiments, the outer drive spindle 320 may instead include a helical channel into which the radial post extends such that the key cam 360 moves in the longitudinal direction as it rotates. In such forms, the key cam 360 may be engaged with the locking member 380 such that longitudinal movement of the key cam 360 moves the locking member 380 between the locking and unlocking positions.

The sleeve spindle 370 includes a tubular body 372, a pair of ridges 374 protruding radially from the proximal portion of the body 372, and a longitudinal slot 376 aligned with the outer drive spindle longitudinal slot 326. When the lockset 100 is assembled, the ridges 374 are received in channels 257 (FIG. 3) formed in the exterior spindle 250, thereby forming a splined connection which rotationally couples the sleeve spindle 370 to the exterior spindle 250.

The locking member 380 includes a body portion 382 seated in the outer drive spindle 320, and an arm 384 extending radially outward through the T-shaped opening 324. The arm 384 further extends into the longitudinal slot 376 formed in the sleeve spindle 370 such that rotation of the sleeve spindle 370 causes the locking member 380 to rotate or pivot about the longitudinal axis 102. As noted above, the locking member 380 is movable between a locking position and an unlocking position to define the locked or unlocked states of the lockset 100.

When the locking member 380 is in the unlocking position (FIG. 5), the arm 384 extends into the longitudinal slot 376 of the sleeve spindle and through the longitudinal slot 326 of the outer drive spindle. As a result, the locking member 380 rotationally couples the sleeve spindle 370 with the outer drive spindle 320. Rotation of the sleeve spindle 370 (i.e., due to rotation of the exterior handle 120) rotates the outer drive spindle 320, which in turn laterally displaces the retractor 340 to thereby retract the latch bolt 136. The lockset 100 is thus positioned in an unlocked state as the exterior handle 120 retracts the latch bolt 136.

When the locking member 380 is positioned in the locking position (not shown), the arm 384 extends into the longitudinal slot 376 of the sleeve spindle and through the circumferential slot 328 of the outer drive spindle. In this state, the arm 384 will travel along the circumferential slot 328 when one of the outer drive spindle 320 and the sleeve spindle 370 is rotated. Thus, rotation of one of the outer drive spindle 320 and the sleeve spindle 370 is not transmitted to the other of the outer drive spindle 320 and the sleeve spindle 370. In the illustrated form, the arm 384 does not extend through the longitudinal slot 376 of the sleeve spindle, and the sleeve spindle 370 and the exterior handle 120 are free to rotate when the locking member 380 is positioned in the locking state. It is also contemplated that when positioned in the locking state, the arm 384 may extend through the longitudinal slot 376 of the sleeve spindle and into a channel (not shown) formed in the chassis 310. In such forms, interference between the chassis 310 and the locking member 380 may prevent the sleeve spindle 370 and the exterior handle 120 from rotating when the lockset 100 is in the locked state. In either case, the sleeve spindle 370 is rotationally decoupled from the outer drive spindle 320, and the exterior handle 120 is in turn not operable to retract the latch bolt 136.

The actuator 390 is connected to the locking member 380 and is configured to move the locking member 380 between the locking and unlocking positions. In the illustrated form, the actuator 390 includes a rotary motor 391 operable to rotate a shaft. A helical spring 392 extends between the locking member 380 and the motor 391 through a tube 394. The distal end of the spring 392 is rotationally coupled to the motor shaft, and the proximal end of the spring 392 is engaged with the locking member 380 such that the locking member 380 moves longitudinally in response to rotation of the spring 392. For example, the locking member 380 may include a pin engaged with the coils of the spring 392 such that the coils urge the locking member 380 longitudinally as the spring 392 rotates. As illustrated in FIG. 5, a plurality of wires 395 connect the motor 391 with an actuator jack 396.

While the illustrated actuator 390 translates rotational motion of the motor 391 to longitudinal movement of the locking member 380, it is also contemplated that the actuator 390 may move the locking member 380 between the locking and unlocking positions in another manner. For example, the actuator 390 may instead include a solenoid which holds the locking member 380 in one position when energized, and returns the locking member 380 to another position when de-energized. In other embodiments, the actuator 390 may include a bi-stable solenoid or an electromagnet which moves the locking member 380 between the locking and unlocking positions.

Figure 6:
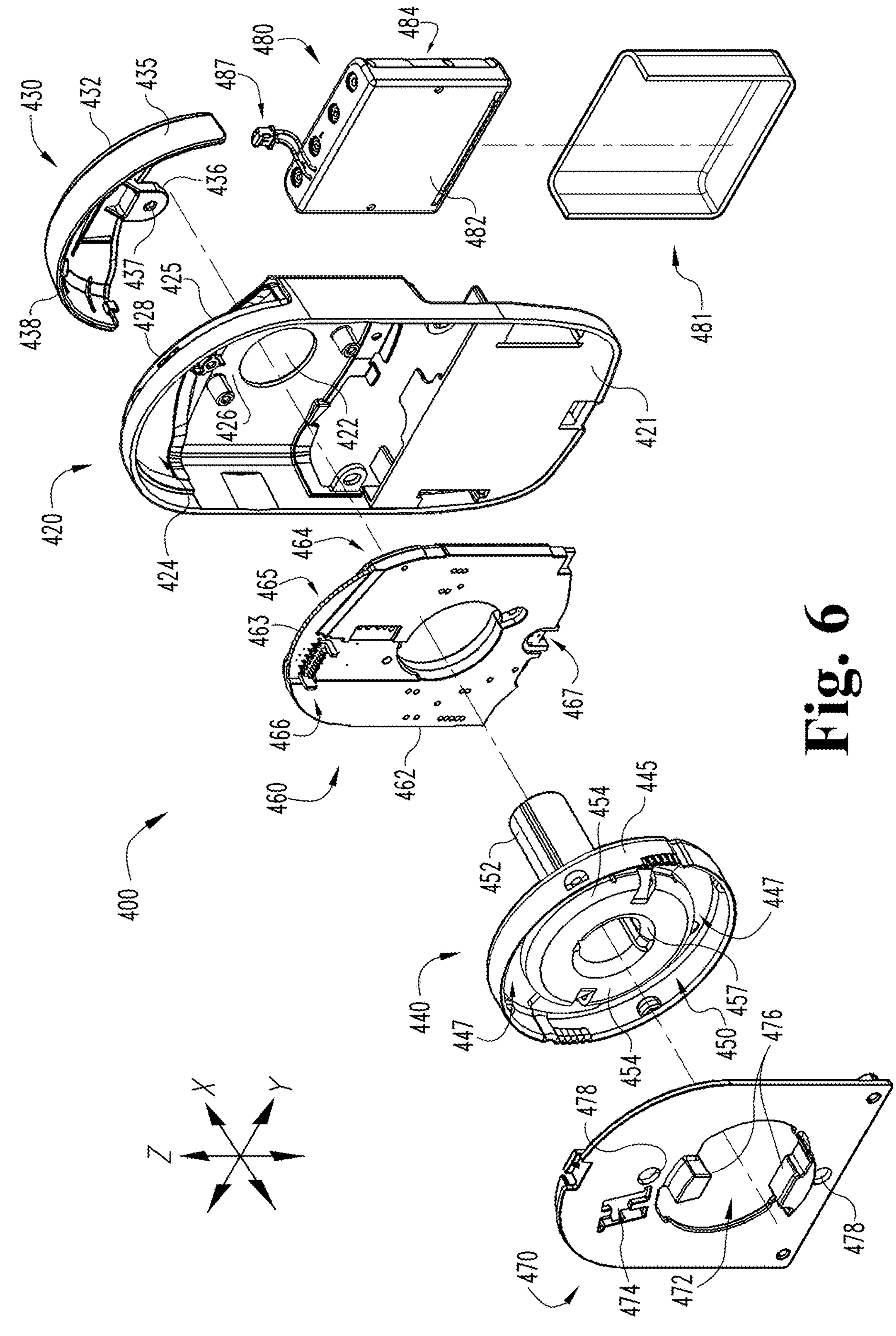
FIG. 6 is an exploded illustration of an interior assembly according to one embodiment of the lockset shown in FIG. 1.
Figure 7:
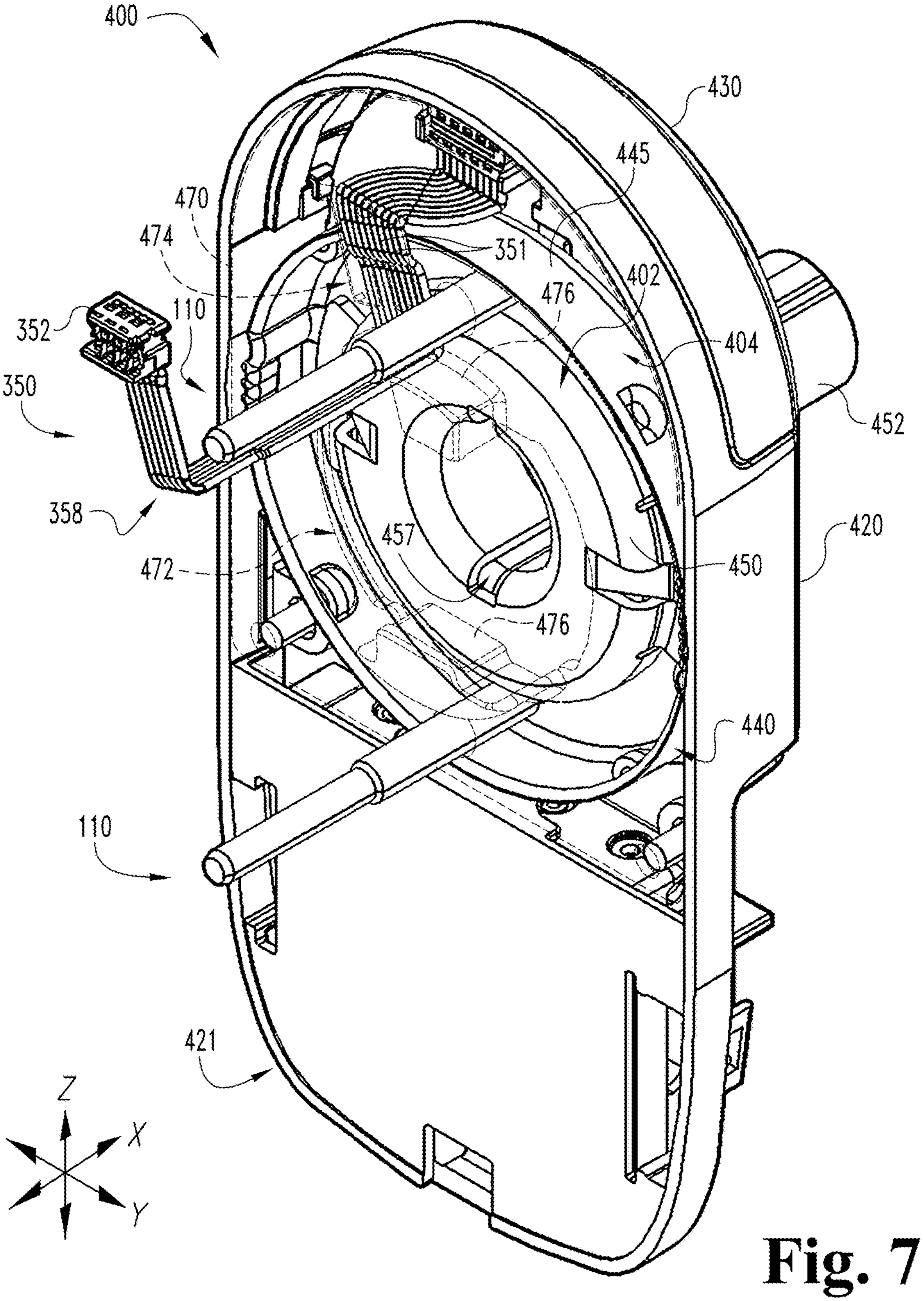
FIG. 7 is a perspective illustration of the interior assembly depicted in FIG. 6.

With reference to FIGS. 6 and 7, the interior assembly 400 generally includes an interior escutcheon 420, a window 430 mounted to the escutcheon 420, a spring cage 440 seated in the escutcheon 420, an interior spindle 450 rotationally coupled to the interior handle 140, a control assembly 460 positioned on the proximal side of the window 430, and an interior backplate 470 which retains the spring cage 440 and control assembly 460 within the escutcheon 420. The interior assembly 400 may further include an onboard power supply 480 which provides electrical power to various elements of the lockset 100.

While other forms are contemplated, in the illustrated embodiment, the interior escutcheon 420, the window 430, the spring cage 440 and the spindle 450 are substantially similar to the above-described exterior escutcheon 220, window 230, spring cage 240 and spindle 250. Similar reference characters are utilized to indicate similar elements and features. For example, the illustrated interior assembly 400 includes elements and features 422, 424, 425, 426, 428, 432, 435, 436, 437, 452, 454, and 457, which respectively correspond to elements and features 222, 224, 225, 226, 228, 232, 235, 236, 237, 252, 254, and 257 of the exterior assembly 200. In the interests of conciseness, the following description focuses primarily on features which are different than those described above with regard to the exterior assembly 200.

The interior escutcheon 420 may include an extension portion 421 which may be formed adjacent the lower portion of the escutcheon 420. In embodiments which utilize the onboard power supply 480, the power supply 480 may be mounted in the extension portion 421, as described below.

As with the exterior spring cage 240, the interior spring cage 440 includes a lip 445 which abuts the interior backplate 470 such that the spring cage 440 defines a boundary between an inner region 402 and an outer region 404. While the exterior spring cage 240 includes distally-extending posts 244, the illustrated interior spring cage 440 need not include posts. Instead, the illustrated interior spring cage 440 includes holes 447 aligned with the posts 244. As described in further detail below, during installation of the lockset 100, the mounting bolts 110 are passed through the interior spring cage holes 447 and the fastener bores 96, and into engagement with the posts 244.

The control assembly 460 generally includes subsystems for data processing, access control, internal and external data communication, and/or power management. More specifically, the control assembly 460 includes a housing 462, one or more printed circuit boards (PCB) 463 seated in the housing 462, a controller 465 mounted to the PCB 463, and an interior jack 466 mounted to the PCB 463 and in communication with the controller 465. The control assembly 460 may further include a power jack 467 which may be configured for connection with the onboard power supply 480 or an external power supply such as, for example, line power.

The control assembly 460 may further include a wireless transceiver 464 which enables wireless communication such as, for example via WiFi and/or Bluetooth low energy (BLE) protocols. The wireless transceiver 464 is aligned with the interior window 430 such that the transceiver 464 is able to wirelessly communicate with external devices 410 through the window 430. In other embodiments, the control assembly 460 need not include the wireless transceiver 464, but may instead include a connection to an external control system, and/or a port configured for a hardwired connection with the external device 410. In such embodiments, the interior window 430 may be omitted, and the interior escutcheon 420 may be configured to cover the control assembly 460.

Figure 8:
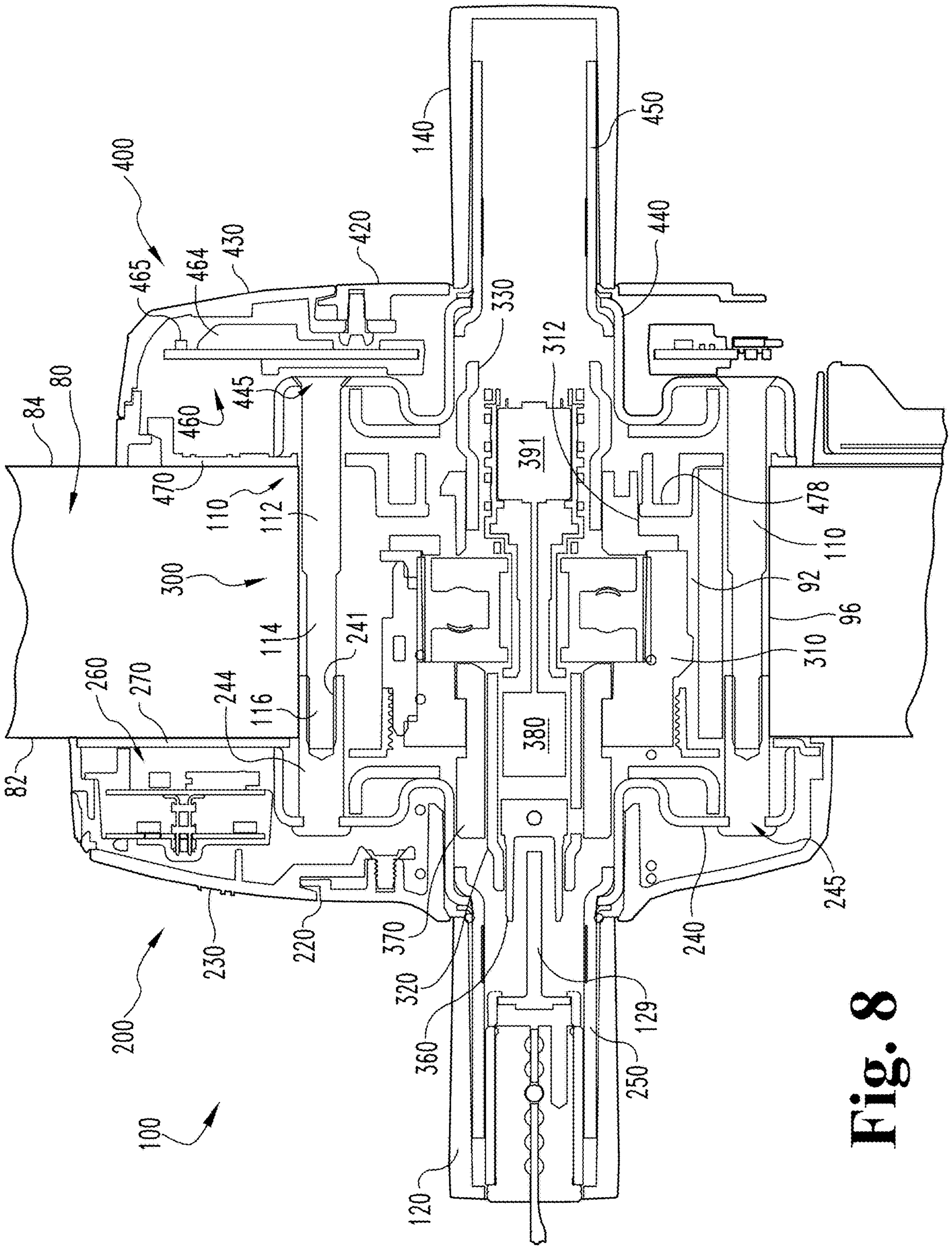
FIG. 8 is a cross-sectional illustration of the lockset depicted in FIG. 1.

The interior backplate 470 is configured to retain various elements of the interior assembly 400 within the interior escutcheon 420. The interior backplate 470 includes a primary opening 472, a secondary opening 474, and a pair of holes 478 positioned on opposite sides of the primary opening 472. As illustrated in FIG. 8, the secondary opening 474 is aligned with the lip 445 of the interior spring cage 440 and extends between the inner region 402 and the outer region 404. When the interior assembly 400 is mounted to the door 80, the secondary opening 474 provides a gap between the lip 445 and the door interior surface 84, thereby defining a channel through which the wires 351 may pass from the inner region 402 to the outer region 404. The holes 478 are aligned with the interior spring cage holes 447, with each hole sized and configured to receive one of the mounting bolts 110. The backplate 470 may further include a pair of lugs 476 extending proximally from opposite sides of the primary opening 472. When the lockset 100 is assembled, the lugs 476 may extend into the cross-bore 92 and engage the flat portions 318 of the chassis 310, thereby rotationally coupling the chassis 310 with the interior assembly 400.

In embodiments which include the onboard power supply 480, the onboard power supply 480 is configured to provide electrical power to various elements of the lockset 100. The power supply 480 may be housed in the interior escutcheon 420 between the extension 421 and a cover plate 481. In the illustrated form, the power supply 480 includes a case 482 which houses one or more batteries 484, and a power plug 487 configured to engage the power jack 467. It is also contemplated that the power supply 480 may utilize another form of energy storage device in addition to or in place of the batteries 484, and that the case 482 may be omitted. For example, the onboard power supply 480 may instead include one or more capacitors or super capacitors in a power supply module.

With collect reference to FIGS. 1-8, when the lockset 100 is assembled and installed on the door 80, the exterior assembly 200 is mounted on the door exterior surface 82, the center assembly 300 is mounted in the door cross-bore 92, and the interior assembly 400 is mounted on the door interior surface 84. Additionally, the latch mechanism 130 is mounted in the door preparation 90 in the manner described above, and the latch bolt 136 is coupled to the retractor 340 via the coupling features 137, 347. With the latch bolt 136 coupled to the retractor 340, rotation of the center assembly 300 about the longitudinal axis 102 is inhibited.

With the exterior and interior assemblies 200, 400 mounted on the door 80, each of the backplates 270, 470 abuts the corresponding door surface 82, 84. Additionally, the spring cages 240, 440 are positioned such that the holes 247, 447 are aligned with the fastener bores 96. In embodiments in which the posts 244 are attached or integrally formed with the exterior spring cage 240, the posts 244 may be aligned with the holes 447 and the fastener bores 96. Each of the posts 244 extends distally from the exterior spring cage 240 and into one of the fastener bores 96. The diameter of each post 244 may be substantially equal to that of the fastener bores 96 such that each post 244 is closely engaged with the corresponding fastener bore 96, thereby inhibiting rotation of the exterior spring cage 240. With the exterior spring cage 240 rotationally coupled to the exterior escutcheon 220, rotation of the exterior assembly 200 is substantially prevented.

In the illustrated form, each of the mounting bolts 110 extends proximally through the interior spring cage holes 447 and into one of the fastener bores 96. While the illustrated posts 244 are associated with the exterior spring cage 240 and the mounting bolts 110 pass through the interior spring cage 440, it is also contemplated that these positions may be reversed. The mounting bolts 110 may include an enlarged diameter portion 112 and a reduced diameter portion 114 including a threaded portion 116. The enlarged diameter portion 112 may have a diameter corresponding to that of the fastener bores 96, and the reduced diameter portion 114 may have a diameter corresponding to that of the post bores 241. The threaded portion 116 of each mounting bolt 110 is threaded into the corresponding post bore 241 such that the exterior and interior spring cages 240, 440, and thus the exterior and interior assemblies 200, 400, are securely mounted on the door 80 and rotationally coupled with one another.

The exterior spindle 250 is rotationally coupled to the sleeve spindle 370, and the interior spindle 450 is rotationally coupled to the inner drive spindle 330. In the illustrated form, the proximal end of the sleeve spindle 370 includes a first geometry including the ridges 374, and the distal end of the exterior spindle 250 includes a second geometry including the channels 257. The first and second geometries are configured to matingly engage with one another. It is also contemplated that rotational coupling of the spindles may be configured in a manner which need not include ridges and channels.

In the illustrated form, the control assembly 460 is in communication with the credential reader assembly 260 via the wire harness 350. More specifically, the exterior plug 352 is engaged with the exterior jack 266, the interior plug 354 is engaged with the interior jack 466, and the first strip 358 connects the exterior plug 352 and the interior plug 354. The exterior jack 266 includes a port configured to couple the credential reader assembly 260 with the control assembly 460 via the first strip 358. Similarly, the interior jack 466 includes a port configured to couple the control assembly 460 with the credential reader assembly 260 via the first strip 358. As a result, the exterior PCB 263 is in communication with the interior PCB 463 via the first strip 358, which in turn runs through the channel 312. With the channel 312 formed on the outer periphery of the chassis 310, the channel 312 provides a clear passage for the first strip 358 through the cross-bore 92, while isolating the wire harness 350 from the moving parts within the chassis 310. The control assembly 460 can thus communicate with and transmit power to the credential reader assembly 260 without requiring modification of the standard door preparation 90. While the illustrated control assembly 460 is in communication with the credential reader assembly 260 via the wire harness 350, it is also contemplated that the control assembly 460 may be in wireless communication with the credential reader assembly 260. In such embodiments, the credential reader assembly 260 may include a wireless transceiver operable to communicate with the wireless transceiver 464, for example via BLE protocols.

The control assembly 460 is also in communication with the actuator 390 via the wire harness 350. More specifically, the actuator plug 356 is engaged with the actuator jack 396, the interior plug 354 is engaged with the interior jack 466, and the second strip 359 connects the actuator plug 356 and the interior plug 354. The actuator jack 396 includes a port configured to couple the actuator 390 with the control assembly 460 via the second strip 359. Similarly, the interior jack 466 includes a port configured to couple the control assembly 460 with the actuator 390 via the second strip 359.

In certain embodiments, the control assembly 460 may have a low-power or sleep mode. In such forms, the control assembly 460 may provide the credential reader assembly 260 with a reduced amount of power when operating in the sleep mode such as, for example, if a credential 210 has not been presented for a predetermined amount of time. The control assembly 460 may then provide the credential reader assembly 260 with full power in response to an awakening event or input such as, for example, an event or input detected by the proximity sensor 268. For example, in embodiments in which the proximity sensor 268 includes a capacitance sensor, the awakening event or input 611 may be a detected change in capacitance such as would occur in response to a user presenting a credential 210 in close proximity to the window 230.

With the lockset 100 assembled and installed on the door 80, the exterior spring cage 240 may be substantially prevented from rotating via close engagement between the posts 244 and the fastener bores 96. The exterior spring cage 240 may in turn substantially prevent rotation of the exterior escutcheon 220 such as, for example, via the above-described rotational coupling provided by the protrusions 229 and grooves 249. Additionally, rotation of the interior assembly 400 is substantially prevented by the lugs 476 which rotationally couple the backplate 470 to the chassis 310. Rotation of the interior assembly 400 may be further inhibited by the mounting bolts 110 which are engaged with the posts 244 and rotationally couple the exterior and interior assemblies 200, 400 to the door 80. As such, no additional fasteners, and therefore no modification of the standard door preparation 90, need be utilized to prevent rotation of the exterior and interior assemblies 200, 400.

Being exposed to the unsecured region, the exterior assembly 200 may be more vulnerable to vandalism and/or tampering than the interior assembly 400 which faces the secured region. For example, a person may manually apply torque to the exterior escutcheon 220 in an attempt to damage or remove the exterior assembly 200. Various features described herein may enable a more compact construction of the exterior escutcheon 220, thereby reducing the amount of torque that a person can manually apply to the exterior assembly 200. In certain embodiments, the greatest dimension of the exterior escutcheon 220 in a direction perpendicular to a rotational axis of the exterior spindle 250 may be less than about six (6) inches. For example, the maximum height of the exterior escutcheon 220 in the illustrated Z direction may be about five (5) inches or less.

Figure 9:
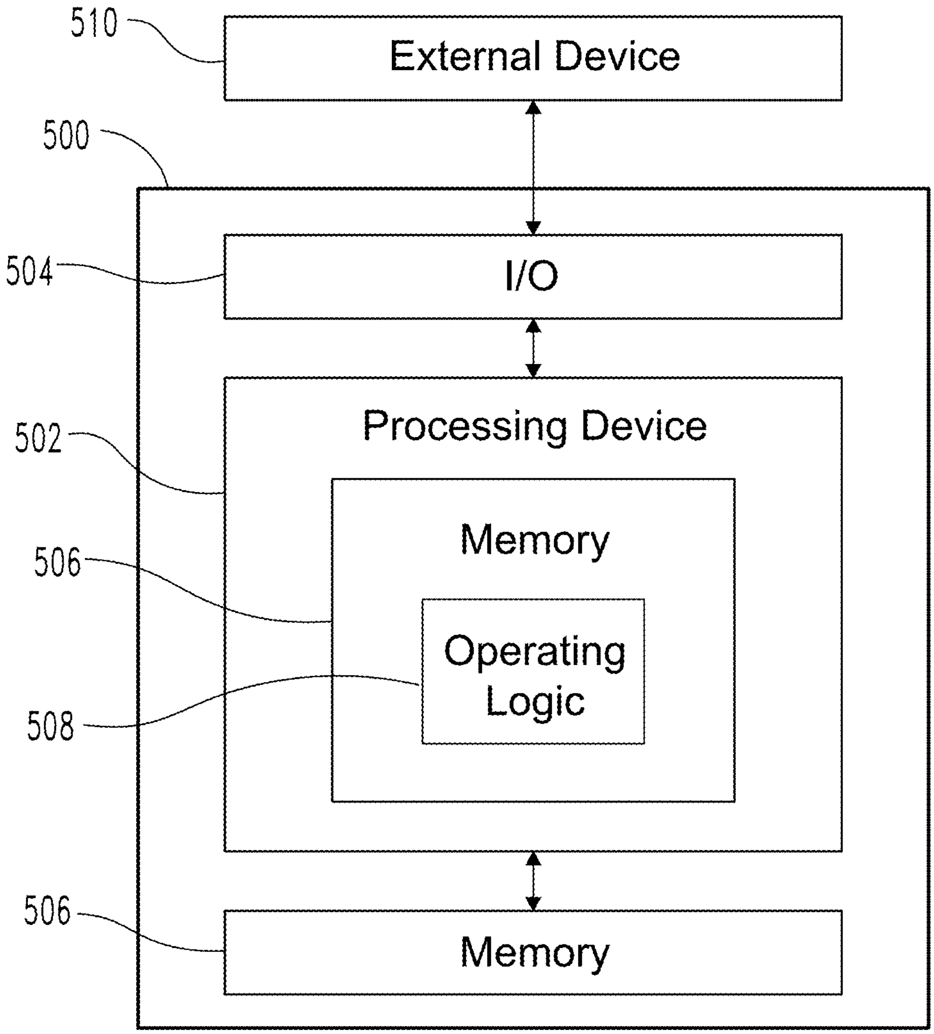
FIG. 9 is a schematic block diagram of a computing device according to one embodiment for use with the lockset depicted in FIG. 1.

FIG. 9 illustrates a schematic block diagram of a computing device 500. The computing device 500 may be configured as a computer, a server, a mobile device, a reader device, or an equipment configuration which may be utilized in connection with the credential 210, the credential reader assembly 260, the external device 410, or the control assembly 460 of the lockset 100. The computing device 500 includes a processing device 502, an input/output device 504, memory 506, and operating logic 508. Furthermore, the computing device 500 may communicate with one or more external devices 510.

The input/output device 504 allows the computing device 500 to communicate with the external device 510. For example, the input/output device 504 may be a network adapter, network card, interface, or a port (e.g., a USB port, serial port, parallel port, an analog port, a digital port, VGA, DVI, HDMI, FireWire, CAT 5, or any other type of port or interface). The input/output device 504 may include hardware, software, and/or firmware. It is also contemplated that the input/output device 504 may include more than one of these adapters, cards, or ports.

The external device 510 may be configured as any type of device that allows data to be inputted or outputted from the computing device 500. For example, the external device 510 may be a mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is also contemplated that the external device 510 may be integrated into the computing device 500. It is further contemplated that there may be more than one external device in communication with the computing device 500.

The processing device 502 can be of a programmable type, a dedicated/hardwired state machine, or a combination of these, and can further include multiple processors, Arithmetic-Logic Units (ALUs), Central Processing Units (CPUs), Digital Signal Processors (DSPs) or the like. For forms of the processing device 502 with multiple processing units, distributed, pipelined, and/or parallel processing can be utilized as appropriate. The processing device 502 may be dedicated to performance of just the operations described herein or may be utilized in one or more additional applications. In the depicted form, the processing device 502 is of a programmable variety that executes algorithms and processes data in accordance with operating logic 508 as defined by programming instructions (such as software or firmware) stored in memory 506. Alternatively or additionally, the operating logic 508 for the processing device 502 is at least partially defined by hardwired logic or other hardware. The processing device 502 can include one or more components of any type suitable to process the signals received from input/output device 504 or elsewhere, and may provide desired output signals. Such components may include digital circuitry, analog circuitry, or a combination of both.

The memory 506 may be of one or more types, such as a solid-state variety, electromagnetic variety, optical variety, or a combination of these forms. Furthermore, the memory 506 can be volatile, nonvolatile, or a combination of these types, and some or all of memory 506 can be of a portable variety, such as a disk, tape, memory stick, cartridge, or the like. Additionally, the memory 506 can store data that is manipulated by the operating logic 508 of the processing device 502, such as data representative of signals received from and/or sent to the input/output device 504 in addition to or in lieu of storing programming instructions defining the operating logic 508. As shown in FIG. 9, the memory 506 may be included with the processing device 502 and/or coupled to the processing device 502.

The processes may be implemented in the operating logic 508 as operations by software, hardware, artificial intelligence, fuzzy logic, or any combination thereof, or at least partially performed by a user or operator. In certain embodiments, modules represent software elements as a computer program encoded on a computer readable medium, wherein the credential 210, the credential reader assembly 260, the external device 410, and/or the control assembly 460 performs the described operations when executing the computer program.

Figure 10:
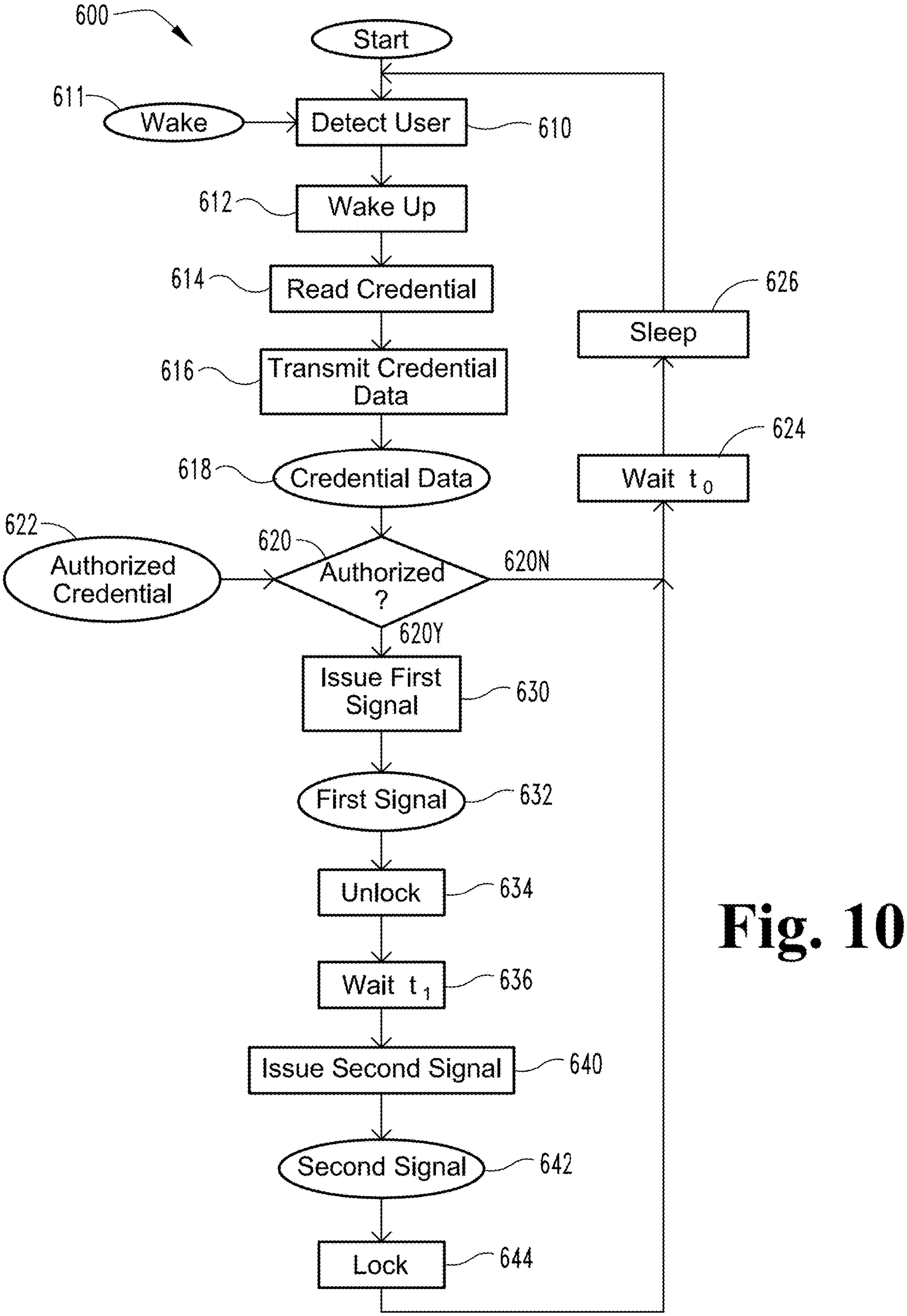
FIG. 10 is a schematic flow diagram of a process according to one embodiment.

With reference to FIG. 10, an exemplary process 600 which may be performed using the lockset 100 is illustrated therein. Operations illustrated for the processes in the present application are understood to be exemplary only, and operations may be combined or divided, added or removed, and/or re-ordered in whole or in part, unless explicitly stated to the contrary. Unless specifically stated to the contrary, it is also contemplated that certain operations or steps performed in the process 600 may be performed wholly by the credential 210, the credential reader assembly 260, the actuator 390, the external device 410, and/or the control assembly 460, and/or that the operations or steps may be distributed among one or more of the elements and/or additional devices or systems not specifically illustrated in FIGS. 1-9.

FIG. 10 illustrates a schematic flow diagram of the exemplary process 600. As noted above, the control assembly 460 may operate in a sleep mode in which it supplies a reduced amount of power to the credential reader assembly 260. In such embodiments, the process 600 may begin with an operation 610 in which the presence of a user is detected. The presence may, for example, be detected in response to an awakening event or input 611 such as, for example, as detected by the proximity sensor 268. In response to the awakening input 611, the process 600 may continue to an operation 612 which includes waking up the credential reader assembly 260, for example, by providing the credential reader assembly 260 with an increased amount of power via the first strip 358. The operation 612 may further include providing an indication to the user that the credential reader assembly 260 is operational such as, for example, by illuminating the LED 268 with a first color.

The process 600 may then proceed to an operation 614 which includes reading the credential 210. For example, the credential reader 264 may attempt to read the smart card 212, and then attempt to read the proximity card 214 if no smart card 212 is detected. In other forms, the credential reader 264 may attempt to read the proximity card 214 first, or may attempt to read both the smart card 212 and proximity card 214 contemporaneously. Once the credential 210 has been read, the process 600 may proceed to an operation 616 which includes transmitting credential data 618 from the credential reader assembly 260 to the control assembly 460 such as, for example, via the first strip 358.

The process 600 may then proceed to an operation 620 which includes comparing the credential data 618 to one or more authorized credentials 622, and then determining whether the credential data 618 matches one of the authorized credentials 622. Data relating to one or more authorized credentials 622 may be stored on internal memory of the control assembly 460 such as, for example, the above-described memory 506. In certain forms, the data relating to the authorized credentials 622 may be provided to the control assembly 460 from an external source such as, for example, via the wireless transceiver 464.

If the credential data 618 does not match an authorized credential 622, the operation 620 yields a negative result 620N. In response to the negative result 620N, the process 600 may reactivate the sleep mode in an operation 626 such as, for example, after waiting a predetermined amount of time to in an operation 624. The process 600 may further include providing an indication to the user that the credential 210 is not authorized such as, for example, by illuminating the LED 268 with a second color.

If the credential data 618 matches an authorized credential 622, the operation 620 yields a positive result 620Y. In response to the positive result 620Y, the process 600 may continue to an operation 630 in which the controller 465 issues a first signal 632 to at least the actuator 390. The first signal 632 may also be sent to the credential reader assembly 260, and the credential reader assembly 260 may provide an indication to the user that the credential 210 is authorized. For example, the indication may include illuminating the LED 268 with a third color.

In response to the first signal 632, the actuator 390 performs an operation 634 which includes moving the locking member 380 from the locking position to the unlocking position. After a predetermined amount of time $t_1$ has elapsed in an operation 636, the process 600 may proceed to an operation 640 in which the controller 465 may issue a second signal 642 to at least the actuator 390. In response to the second signal 642, the actuator 390 performs an operation 644 which includes moving the locking member 380 from the unlocking position to the locking position. The second signal 642 may also be sent to the credential reader assembly 260, and the credential reader assembly 260 may provide an indication to the user that the lockset 100 is transitioning to the locked state. For example, the indication may include illuminating the LED 268 with the first color. After the operation 644, the process 600 may proceed to the operation 626 and reactivate the sleep mode such as, for example, after the predetermined time to has elapsed in the operation 624. While the illustrated process 600 includes various operations to provide the lockset 100 with a sleep mode, the lockset 100 need not necessarily include a sleep mode. In such embodiments, various operations, such as the operations 610, 612, 624, and 626, may be omitted.

As indicated above, the illustrated actuator 390 includes a rotary motor 391. As such, the first signal 632 may include power of a first polarity, and the second signal 642 may include power of an inverted polarity. The motor 391 may rotate in a first direction in response to the first signal 632, and may rotate in an opposite direction in response to the second signal 642. In embodiments in which the actuator 390 instead includes a solenoid, one of the first and second signals 632, 642 may include power being supplied to the actuator 390, and the other of first and second signals 632, 642 may include power being removed from the actuator 390. For example, if the lockset 100 is operating in a fail-secure mode, the first signal 632 may include supplying power to the actuator 390. In such embodiments, the locking member 380 may be biased to the locking position such that when the solenoid is unpowered, the lockset 100 is in the locked state.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lockset assembly, comprising:

an escutcheon;

a spring cage including a lip that defines a boundary between an inner region that is circumferentially surrounded by the boundary and an outer region that is positioned outside the boundary;

a first electronic device seated in the outer region;

a backplate coupled to the escutcheon and retaining the first electronic device within the escutcheon, the backplate defining an opening extending between the inner region and the outer region; and a wire extending across the boundary through the opening and connecting the first electronic device to a second electronic device.

2. The lockset assembly of claim 1, wherein the first electronic device comprises a control assembly.

3. A system comprising the lockset assembly of claim 1, further comprising a chassis connected with the lockset assembly, the chassis comprising:

a latch operable to retract in response to rotation of a spindle rotatably mounted to the escutcheon; and a channel in which a portion of the wire is seated.

4. A system comprising the lockset assembly of claim 1, further comprising a second lockset assembly, the second lockset assembly comprising a second escutcheon and the second electronic device, wherein the second electronic device is seated in the second escutcheon.

5. The system of claim 4, wherein the second escutcheon has a second inner region and a second outer region;

wherein the second electronic device is seated in the second outer region;

wherein the second lockset assembly further comprises:

a second spring cage defining a boundary between the second inner region and the second outer region; and a second backplate defining a second opening; and wherein the second opening extends between the inner region and the outer region; and wherein the wire extends through the second opening.

6. The lockset assembly of claim 1, further comprising a spindle rotatably mounted to the spring cage for rotation about a longitudinal axis; and wherein the boundary circumferentially surrounds the longitudinal axis such that the longitudinal axis extends through the inner region.

7. The lockset assembly of claim 1, wherein, with the escutcheon mounted to a door surface, the backplate is positioned between the spring cage lip and the door surface to thereby form a gap through which the wire extends across the boundary.

8. A lockset, comprising:

a first assembly, comprising:

a first escutcheon comprising a first outer region and a first inner region;

a first spring cage comprising a first lip that defines a first boundary between the first outer region and the first inner region;

a first electronic device seated in the first outer region; and a first backplate coupled to the first escutcheon and retaining the first electronic device within the first escutcheon, the first backplate defining a first opening crossing the first boundary and extending between the first inner region and the first outer region;

a second assembly, comprising:

a second escutcheon comprising a second outer region and a second inner region; a second spring cage comprising a second lip that defines a second boundary between the second outer region and the second inner region;

a second electronic device seated in the second outer region; and a second backplate coupled to the second escutcheon and retaining the second electronic device within the second escutcheon, the second backplate defining a second opening extending between the second inner region and the second outer region; and a wire connecting the first electronic device and the second electronic device, the wire extending across the first boundary through the first opening and the second opening.

9. The lockset of claim 8, further comprising a chassis connected between the first assembly and the second assembly; and wherein a portion of the wire is received in a channel formed in the chassis.

10. The lockset of claim 8, wherein the first electronic device comprises a first electronic device electrical connector; and wherein the second electronic device comprises a second electronic device electrical connector.

11. The lockset of claim 10, further comprising a wire harness, the wire harness comprising:

a first wire harness electrical connector engaged with the first electronic device electrical connector;

a second wire harness electrical connector engaged with the second electronic device electrical connector; and the wire; and wherein the first wire harness electrical connector is connected with the second wire harness electrical connector via the wire.

12. The lockset of claim 8, wherein the first electronic device comprises a printed circuit board; and wherein a spindle extends through an opening in the printed circuit board.

13. The lockset of claim 12, wherein the printed circuit board circumferentially surrounds a portion of the spindle.

14. A method of operating an access control device comprising an escutcheon having an inner region and an outer region, a first electronic device mounted in the outer region, a second electronic device, and a backplate retaining the first electronic device in the outer region of the escutcheon, the method comprising:

transmitting, from the first electronic device to the second electronic device, an electronic signal via a wired transmission line, wherein the wired transmission line extends between the outer region and the inner region through an opening in the backplate, wherein the wired transmission line extends through the opening across a boundary defined between the inner region and the outer region, and wherein the boundary is defined by a lip of a spring cage.

15. The method of claim 14, wherein the first electronic device comprises a control assembly;

wherein the second electronic device comprises an electronic actuator; and wherein the electronic signal causes the electronic actuator to alter a state of the access control device.

16. The method of claim 14, wherein the access control device further comprises a chassis comprising a latch and a channel; and wherein a portion of the wired transmission line extends along the channel.

17. The method of claim 1, wherein the access control device further comprises:

a wire harness comprising the wired transmission line and an additional wired transmission line; and a third electronic device electrically connected with the second electronic device via the additional wired transmission line; and wherein the method further comprises transmitting, from the second electronic device to the third electronic device, an additional electronic signal via the additional wired transmission line.

18. The method of claim 14, wherein the backplate is positioned between a door surface and the lip of the spring cage such that the opening forms a gap between the door surface and the lip of the spring cage; and wherein the wired transmission line crosses the boundary by passing through the gap.

* * * * *